United States Patent [19]

Diggs

[11] 4,033,528

[45] July 5, 1977

[54] AIRCRAFT PARACHUTE SYSTEM

[76] Inventor: Richard E. Diggs, 12A Road, Carthage, Mo. 64836

[22] Filed: July 1, 1976

[21] Appl. No.: 701,630

[52] U.S. Cl. .............................. 244/139; 244/147
[51] Int. Cl.$^2$ ...................................... B64D 17/00
[58] Field of Search ............... 244/139, 138 R, 140, 244/147

[56] References Cited

UNITED STATES PATENTS

| | | | |
|---|---|---|---|
| 1,465,835 | 8/1923 | Atkinson | 244/139 |
| 1,782,134 | 11/1930 | Coplen | 244/139 |
| 1,853,874 | 4/1932 | Monteleone | 244/139 |
| 1,900,891 | 3/1933 | Crane | 244/139 |
| 2,352,721 | 7/1944 | Krahel | 244/139 |
| 2,392,448 | 1/1946 | Atherton | 244/139 |
| 3,097,819 | 7/1963 | Raistakka | 244/139 |

Primary Examiner—Trygve M. Blix
Assistant Examiner—Charles E. Frankfort
Attorney, Agent, or Firm—Shoemaker and Mattare, Ltd.

[57] ABSTRACT

A parachute system removably mounted on an aircraft. The system comprises a container removably and releasably attached to an aircraft fuselage. The container has a lid which is biased open and a locking mechanism which maintains the lid closed until a parachute is to be deployed. A drogue chute ejecting mechanism ejects a drogue chute when the lid is opened, and the drogue chute deploys a main chute stored in the container and which is connected to that container. A coupling attaches the container to the aircraft fuselage and is disconnectable so that the chute system can be jettisoned from the aircraft.

17 Claims, 9 Drawing Figures

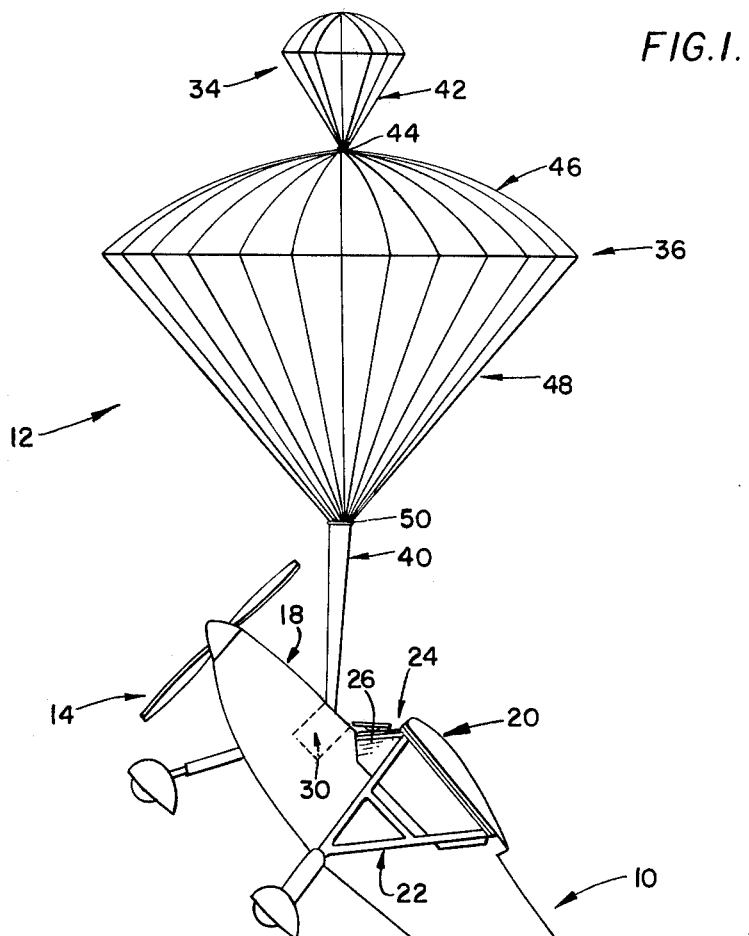
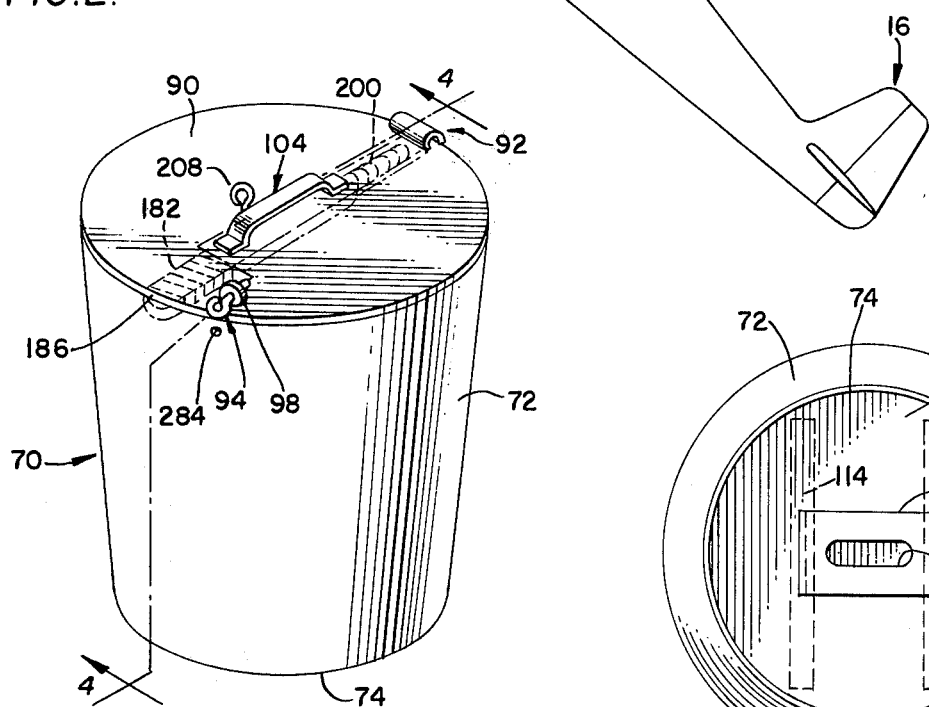
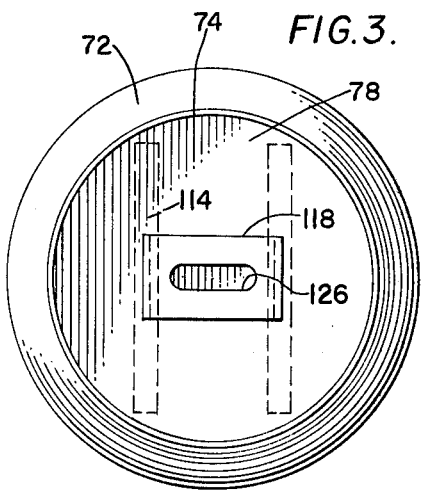

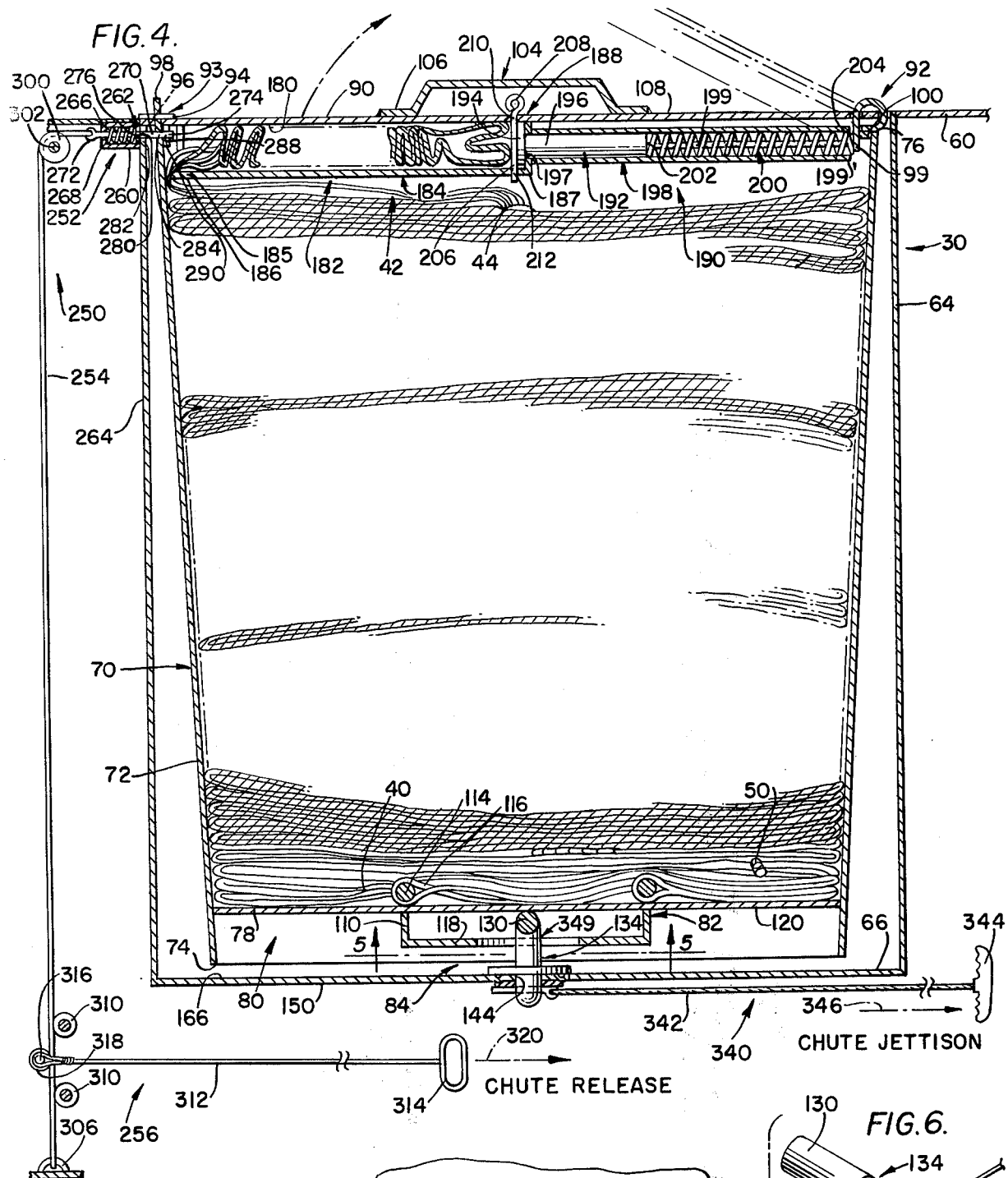

AIRCRAFT PARACHUTE SYSTEM

BACKGROUND OF THE INVENTION

The present invention relates to aircraft safety equipment, and, more particularly, to parachute equipment.

As flying gains popularity, more and more people are being injured and killed in aircraft related accidents, especially in the so-called small aircraft often used in the private sector of the air transportation field where pilot proficiency is often less than that proficiency found in the commercial or military sectors of the field. In the past, if an airplane became disabled in flight, the plane crash landed with the attendant damages, injuries and loss of life. Heretofore, the only alternative to crash landing with the plane was for the pilot and other passengers to bail out and parachute to earth, in which event, the pilotless plane crash landed and was lost. All too often, the pilotless plane crashed into other structures, resulting in further damages, injuries or loss of life.

Because of such pilotless plane crashes, there have been a number of systems proposed which include parachutes affixed to the aircraft itself to decelerate the descent of that aircraft. These proposed systems all have included parachute systems which are permanently affixed to the aircraft structure and which are heavy, elaborate and expensive. The elaborate and permanent nature of such systems makes them difficult, if not impossible, to install on existing aircraft, that is aircraft which were built without such systems and which must be adapted or remodeled to use them, and hence, are not conducive to wide acceptability.

Furthermore, once deployed, the systems of almost all known proposals are irreversible. That is, should the emergency causing condition be corrected, the craft still must be crash landed, albeit a crash landing which is softened by the parachute. Thus, a pilot has but a mere instant to determine whether a condition is serious enough to sacrifice the craft, or whether it is correctable, for, once the parachutes of such systems are deployed, the procedure is irreversible and the parachute controlled descent must be completed. Only one known system provides for the jettisoning of the parachute system after deployment thereof. However, this system also uses elaborate and permanently installed equipment, which is expensive, and is hence not conducive to wide adaptability and use on existing structures, especially in small private planes where the expense of the system may be prohibitive.

The present invention provides a parachute system which is removable from the aircraft and is portable, so that it can be moved from one structure to another.

SUMMARY OF THE INVENTION

The parachute system embodying the present invention is simple and inexpensive and can be removed from one aircraft and installed in another, or stored, as desired.

The parachute system comprises a main chute stored in a container which is portable and has a locking means for releasably, although securely, locking that container in a container storage well defined in the aircraft fuselage. The storage well is located forward of and above the center of gravity of the airplane, so that the airplane assumes a tail-down tilted attitude during descent. The tail-down attitude enables the plane to recover powered flight should the emergency situation be corrected during descent, and further places the plane structure between the pilot and passengers and the initial impact point on the plane. Such placement of the aircraft structure serves to protect the pilot and passengers somewhat from injuries due to the impact shock of the landing.

The container comprises a lid which is biased open and which has a lid locking mechanism associated therewith to retain the lid closed until it is desired to deploy the parachute.

A drogue chute is located in a container on the lid and an initiator mechanism deploys the drogue chute when the lid is released and springs open. The drogue chute is attached to the main chute and deploys that chute which is, in turn, tethered to the container.

The container is detachably affixed to the aircraft and, should the emergency situation be corrected after the chutes have been deployed, the system embodying the present invention has a chute jettisoning mechanism which releases the container from attachment to the fuselage, and hence jettisons the entire parachute system from the airplane.

Suitable remote actuation systems, such as mechanical sensors and linkages, can also be used to control deployment and jettisoning of the chute system without manual intervention or actuation by the pilot. Such remote control systems may, for example, be strategically installed to sense structural failures, such as wing failures or tail failures. Other emergency conditions might include explosions, fires, engine failure and the like. Suitable override systems may also be employed, so that the system cannot be jettisoned unless the probability of restart is very high.

The container has a carrying handle and safety detents so it can be stored in an area separate from the airplane. The system can then be easily and quickly installed on the airplane prior to take-off. Being removable, inexpensive and portable, the system is amenable and conducive to installation on all craft, even small aircraft where expense may be an important consideration. It is only necessary to provide a suitable storage well on the plane to adapt that plane for use with the parachute system embodying the present invention.

Accordingly, it is even possible that a plane be merely altered slightly to provide the storage well, and the remainder of the parachute system rented from either another aircraft owner or a rental agency. Furthermore, improvements are easily incorporated in such a system, as the only portion thereof which requires aircraft structure alteration is the container receiving well.

The parachute system of the present invention has application in planes used for crop dusting, stunt shows, teaching, or planes often used in bad weather or other risky conditions. The preferred application is to small aircraft, but it is envisioned that such systems can be adapted to large military or commercial aircraft, wherein each aircraft might utilize several systems strategically placed on the aircraft structure.

While the present system will not totally prevent damage to the aircraft, it will reduce such damage considerably and is of such a low cost as to justify the installation of suitable equipment, even in those planes operating on a very tight budget. The removable feature makes the present system amenable to renting, or otherwise shifting from one plane to another to provide the maximum usage for each system. The removable feature further makes these devices amenable to improvements and makes improved devices well within the reach of all airplane owners and users.

OBJECTS OF THE INVENTION

It is, accordingly, a main object of the present invention to provide an aircraft parachute system which is removable from that aircraft. It is another object of the present invention to provide an aircraft parachute system which is portable. It is a further object of the present invention to provide an aircraft parachute system which is easily installed on all aircraft, including existing aircraft.

It is yet a further object of the present invention to provide an aircraft parachute system which is amenable to improvements.

These together with other objects and advantages which will become subsequently apparent reside in the details of construction and operation as more fully hereinafter described and claimed, reference being had to the accompanying drawings forming part thereof, wherein like reference numerals refer to like parts throughout.

BRIEF DESCRIPTION OF THE DRAWINGS

FIG. 1 is an elevation of the parachute system embodying the teachings of the present invention in a deployed configuration.

FIG. 2 is a perspective of a container used in conjunction with the parachute system embodying the teachings of the present invention.

FIG. 3 is a bottom end view of the container shown in FIG. 2.

FIG. 4 is a sectional elevation view taken along line 4—4 of FIG. 2.

FIG. 5 is a sectional view taken along line 5—5 of FIG. 4.

FIG. 6 is a perspective, exploded view of a locking mechanism utilized in the parachute system embodying the teachings of the present invention.

DETAILED DESCRIPTION OF THE PREFERRED EMBODIMENT

Figure 7:
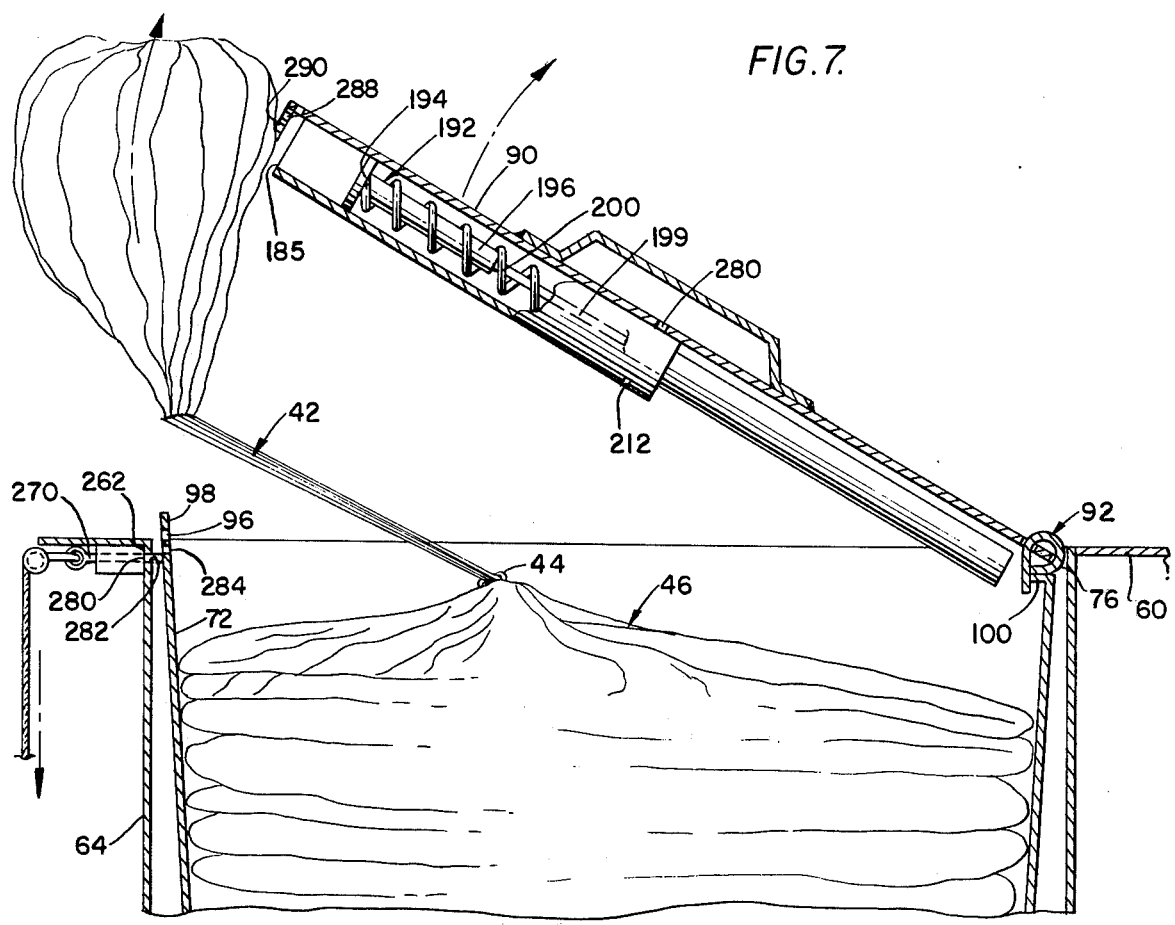
FIG. 7 is a sectional view of the parachute system of the present invention in a partially deployed configuration.

Shown in FIG. 1 is an airplane 10 pendently suspended by a parachute system 12. The airplane is shown as a single engine plane having a propeller 14, a tail section 16, cowling 18, wings 20 supported by struts 22, and a cockpit 24 having a windshield 26. The plane is shown in FIG. 1 as being a single engine plane, but could be any other type aircraft.

Figure 9:
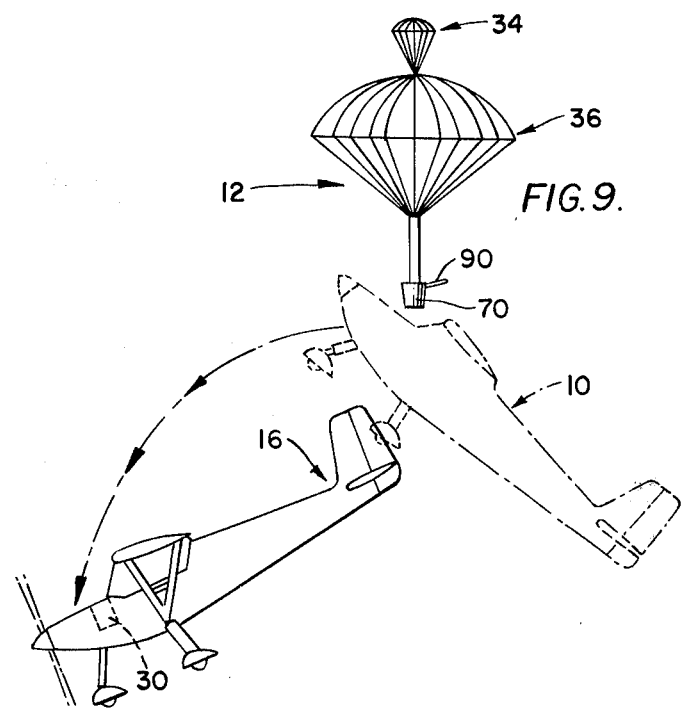
FIG. 9 is a schematic representation of an airplane representing the jettisoning of the parachute system embodying the teachings of the present invention.

The parachute system 12 is affixed to the plane above and forward of the center of gravity thereof, and is shown in FIG. 1 to be affixed just forward of the windshield 26 and in the top of cowling 18 in a storage well 30. The storage well 30 will be fully discussed below. By locating the parachute system above and forward of the center of gravity of the aircraft, the aircraft will assume the taildown canted or tilted orientation shown in FIG. 1 so that, if the engine is restarted, the aircraft will be in a desirable recovery attitude. As shown in FIG. 1, the preferred orientation is 45° with respect to the vertical, but other suitable attitudes can be used. In such an attitude, after engine restart, the chute system can be jettisoned, and the plane flown on to its primary, or alternative destination, as desired. Such an aborted recovery is indicated in FIG. 9, and will be discussed below. Upon impact, the tail section 16 strikes the ground first, thereby minimizing damage to the aircraft structure as a whole and protecting the passengers by locating a maximum amount of the plane between the initial impact point on the plane and the passengers. Furthermore, the 45° attitude utilizes wing and body surfaces to slow the descent of the plane.

The parachute system comprises a drogue parachute 34 connected in piggyback fashion to a main parachute 36 which is attached to the plane by riser lines 40. As shown, shroud lines 42 of the drogue chute are attached by a collector ring 44 to canopy 46 of the main chute, and shroud lines 48 of the main parachute are attached to the riser lines by a collector ring 50.

With reference to FIGS. 2–4, and particularly FIG. 4, the storing means for storing the parachutes and the chute deployment and jettisoning means will be described. As shown in FIG. 4, storage well 30 is defined in the fuselage 60 of the airplane and has a wall 64 and a bottom 66. A parachute storage container 70 is positioned inside the well 30 prior to take-off and is essentially conical in shape. The container 70 closely resembles a bucket and comprises a wall 72 having a bottom rim 74 and a top rim 76. A bottom 78 is offset from bottom rim 74 to define a counterbore 80 in which a keeper 82 is located. The keeper 82 is part of a locking mechanism 84 which will be described below.

A lid 90 is hingeably connected to top rim 76 by a spring hinge 92 and is held in place by a temporary locking mechanism 93, which includes a removable lock pin 94 fitted through an eye 96 in a bracket 98 located on the top rim 76 and affixed thereto. The spring hinge 92 is generally P-shaped, with the bottom portion of the P engaged against top rim 76 and leg 99 of the P is engaged against the rear end of the lid 90 to continuously urge that lid into an open position, which is indicated in dotted lines in FIG. 4. A ledge 100 is located on the top rim 76 to support the hinge, as best shown in FIG. 7, with the lid in an open position. A carrying handle 104 has wings 106 which are affixed to outside top surface 108 of the lid 90, as by welding or the like. With the lid retained closed by the locking mechanism 93, the storage container can be carried by the handle.

A container 70 is releasably and detachably held in the well 30 by the locking mechanism 84. As shown in FIGS. 4 and 5, the keeper comprises a box-like housing with walls 110 affixed to and extending through bottom 78 of the container 70. On the inside of the container 70, and rigidly affixed to free ends of the walls, is a tethering bar 114 to which is attached the lower ends of the riser lines 40 by loops 116. The housing walls are rigidly attached to a slotted place 118 spaced from bottom surface 120 of the bottom wall 78, and has an elongated slot 124 defined therein.

The slot 124 has a pair of elliptical ends 126 and is sized to receive head 130 of a T-lug 134. As shown in FIG. 6, the T-lug 134 comprises head 130 and body 136 around which is positioned a flange 138 having friction producing beads 140 defined thereon. Depending beneath the flange is a lobe 142 which extends through a hole 144 defined in bottom 66 of the well 30 and which has a transverse hole 146 defined therein to be located closely adjacent, but spaced from, outer surface 150 of the bottom 66 when the T-lug is positioned to attach the container to the well. A washer 154 having upper surface 156 and lower surface 158 thereon is adapted to be placed around lobe 142 and held so that upper surface 156 is flushly engaged against outer surface 150 of the bottom 66, with the washer located between surface 150 and hole 146. A cotter 160 having a cable-attaching eye 162 on one end thereof is received in hole 146 to secure the T-lug in position with lower surface 164 of flange 138 flushly engaged against inner surface 166 of the bottom 66 and upper surface 156 of the washer 154 flushly engaged against outer surface 150 of the bottom 66.

With the container oriented so that slot 124 is longitudinally aligned with head 130, the lug and the slot can be interengaged so that the lug head is positioned on the inside of the keeper housing. The container can then be rotated so that the lug head is oriented transversely of the slot in the position shown in FIGS. 4 and 5 to lock the container in place within the well 30. The friction beads 140 serve to increase the frictional engagement between the T-lug and the bottom 66.

As shown in FIG. 4, inner surface 180 of the lid 90 has attached thereto a drogue chute ejection system 182 comprising a hollow drogue chute storage tube 184 having a first end 185 located adjacent free end 186 of the lid 90, and the other end 187 located at or near the center 188 of the lid 90.

An initiator mechanism 190 is shown in the retracted or cocked position in FIG. 4, and comprises a free sliding plunger 192 having a head 194 located within tube 184 adjacent end 187 of that tube. The end 187 has a hole defined therein to slidably receive plunger shaft 196 of the plunger which extends into and is slidably received in end 197 of guide tube 198. A guide rod 199 has one end attached to the plunger shaft 196 and the other end seated against leg 99 of the hinge 92 when the initiator is in the cocked position shown in FIG. 4. The tube 198 is supported on surface 180 of the lid and has another end 199' located immediately adjacent leg 99 of the spring hinge 92. A compression spring 200 is positioned within the tube 198 to have one end engaged against rear surface 202 of the plunger shaft 196 and the other end seated on and engaged against top surface 204 of leg 99 to continuously urge the plunger outwardly of the tube 198, and hence to continuously urge free sliding plunger head 192 outwardly of drogue chute storage tube 184 toward end 185.

A safety retaining detent 206 having an eye 208 thereon is removably received in aligned holes 210 and 212 defined respectively through lid 90 and drogue chute storage tube 184. The detent 206 acts as a barrier to retain the piston head 192 in the retracted or cocked position shown in FIG. 4, and is removed prior to take-off.

The drogue chute 34 is foldably received in tube 184 and the piston head 192 bears thereon when the detent 206 is removed, and the drogue chute in turn bears against the inside surface of the container, so that when the lid is closed, the container, via the drogue chute, resists the outward urging of the initiator mechanism. The drogue chute 34 has shroud lines 42 connected to collector ring 44 which, in turn, is affixed to the top surface of the main chute canopy 46. The main chute shroud lines 48 are connected via collector ring 50 to riser lines 40, which are connected to tethering bars 114, as above described, to fasten the parachute system to the container, and hence to the fuselage via locking mechanism 84 and well 30. The main parachute is shown in FIG. 4 in the packed state within the container 70.

Shown in FIG. 4 is a chute release mechanism 250 comprising a lid release mechanism 252 connected to a cable release 254 to which is connected a cable release remote actuator mechanism 256. The lid release mechanism 252 includes an elongated housing 260 attached at one end 262 to outside surface 264 of well 64 and has positioned therein a compression spring 266 which has one end thereof seated on the inside surface of the other end 268 of the housing.

A detent pin 270 is horizontally disposed and has an eye 272 on one end, a free end 274 and a flange 276 positioned thereon between the eye and end 274. The pin is longitudinally aligned within the housing 260 and is slidably received in aligned holes 280, 282 and 284 defined respectively in end 268 of the housing, well wall 64 and container wall 72, so that eye 272 is located on the outside of the housing and flange 276 is located adjacent surface 264 of the well wall to be urged thereagainst by spring 266.

Free end 187 of the lid 90 has a lip 288 depending therefrom which has defined therein a hole 290. The hole 290 is located in the lip 288 to be aligned with holes 280 through 284 when the lid is closed, so that free end 274 of the detent pin 270 fits therethrough to lock the lid in the closed position shown in FIG. 4.

A sheave 300 is attached to the fuselage 60 by a shaft 302 and is located adjacent the lid release mechanism 252. The cable release 254 is attached at one end to eye 272 and at the other end to cleat 306 which is attached to the fuselage, or any other suitable aircraft structure. The cable rises from cleat 306 and is trained around sheave 300 to approach pin 270 in a horizontal orientation, so that the cable and the pin are longitudinally aligned in the vicinity of the eye 272 to produce the maximum pull on the pin 270.

The remote actuator mechanism 256 comprises a pair of vertically spaced apart guide rollers 310 engaged against the cable release 254 near cleat 306 and a cable 312 attached at one end to a handle 314, and at the other end is looped around a shaft 316 of a trundle 318. The trundle is located vertically interjacent guide rollers 310, and the cable release 254 is interposed between the trundle and the rollers, as shown in FIG. 4.

The chute release handle 314 is located in cockpit 24 near the pilot for each access. When the handle is pulled in the direction indicated by arrow 320, the trundle engages the cable release 254 and pulls it between rollers 310, thereby pulling detent pin 270 outwardly toward sheave 300 and out of hole 290 to release lid 90 to be sprung outward by the outward urging of spring hinge 92.

A chute jettisoning system 340 comprises a jettisoning cable 342 attached at one end to eye 162 of cotter 160 and at the other end to a handle 344, which is located in cockpit 24 within easy reach of a pilot. Pulling the handle 344 in the jettisoning direction indicated by arrow 346 pulls the cotter 160 from hole 146 to release the T-lug from engagement within the well 30, thus freeing the container 30 from fuselage 60. It is noted that either of the cables 312 or 342 can be replaced by any appropriate mechanical linkage.

Figure 8:
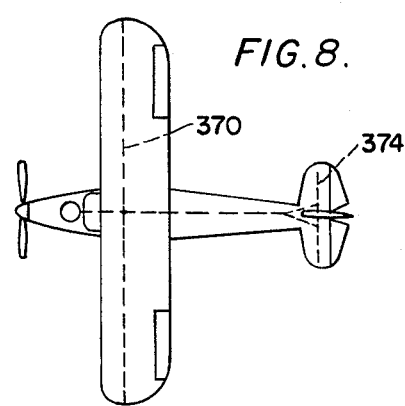
FIG. 8 is a top plan view of an airplane utilizing the parachute system embodying the teachings of the present invention.

As mentioned above, automatic chute deploying systems can be utilized with the system 12. Such an automatic system is represented schematically in FIG. 8, and includes cables 370 attached to the wings of the plane and cable 374 attached to the tail of the plane, so that should a failure of the magnitude likely to cause a plane crash occur in either the wings or the tail of the airplane, the system 12 will be automatically deployed. The cables 370 and 374 can represent cables in a mechanically actuated system similar to that disclosed in U.S. Pat. No. 1,900,891.

If mechanical cables are used, such cables can be connected to cable 312 of the chute deploying system 256; and if an electronic system is used, suitable solenoid operated switches could, for example, operate to move detent pin 270 of the lid release mechanism 252. Alternatively, the mechanical system could also be connected directly to the detent pin 270.

Having described the various features of the parachute storage, deployment and jettisoning systems, the operation thereof will now be discussed. Prior to takeoff, the container 70 with the packed chutes therein is positioned in the storing well 30. It is noted that the temporary locking mechanism 93 maintains lid 90 of the container closed against the opening bias applied thereto by spring hinge 93. The container is lifted by the carrying handle 104 and positioned inside well 30. It is also noted that a cover (not shown) can be positioned over the well 30 when a container is not located therein. When the system 12 is in use, the cover can be removed and stored in the aircraft.

After locating the container in the well, the container is rotated about its longitudinal axis to align T-lug head 130 with slot 124 of the keeper 82, and the container is then lowered into the well until the head 130 is positioned within the keeper housing. The container 70 is then again rotated about its longitudinal axis to orient the slot transversely of the T-lug head as shown in FIGS. 4 and 5. This rotation is preferably 90 degrees, but other values can also be used, just so the T-lug is sufficiently secured in the keeper to securely attach the container to the aircraft. The T-lug head is positioned slightly above the surface of the slotted plate 118 so that a slight gap, indicated by the numeral 349, is defined between the top of the plate and the bottom of the head. The purpose of this gap will be described below.

When the container is first inserted into the well 30, the detent pin 270 of the lid release mechanism 252 is out of alignment with aligned holes 284 and 290 of the container wall 72 and lid lip 288, respectively. The detent pin 270 remains non-aligned with those holes when the container is oriented to longitudinally align slot 124 with T-lug head 130, but becomes aligned with those holes when the container is rotated into the locked position wherein the slot 124 is oriented in the locked position with respect to head 130, as shown in FIG. 4. When the detent pin becomes aligned with holes 284 and 290, the spring 266 causes that detent pin to be moved into those holes, thereby locking the lid 90 to the container wall 72. The detent pin thus maintains the lid closed against the opening bias of spring hinge 92. Once the detent pin 270 locks the lid closed, i.e., when the container is suitably secured within well 30, the lock pin 94 of the temporary locking mechanism 93 and the safety retaining detent 206 can be, and are, removed. The lid is urged open by the spring hinge 92, but is retained closed by the detent pin 270, and the drogue chute 34 is urged outwardly of tube 184 by the plunger 192 of the initiator mechanism, but is retained in tube 184 by engagement with the wall 72. The parachute system is now in place and ready for use.

In flight, should an emergency situation arise, such as an engine failure, the parachute can be deployed remotely by, for example, a suitable mechanical means. If the mechanical deployment is used, the handle 314 is moved in the direction of arrow 320 to move trundle 318 in the direction of arrows 320. A suitable mechanical means is disclosed in U.S. Pat. No. 1,900,891.

When the container is first inserted into the well 30, the detent pin 270 of the lid release mechanism 252 is out of alignment with aligned holes 284 and 290 of the container wall 72 and lid lip 288, respectively. The detent pin 270 remains non-aligned with those holes when the The trundle moves between guide rollers 310 to pinch cable release 245 between those rollers and thereby move that cable release around sheave 300 and withdraw detent pin 270 from the engaged position in holes 284 and 290. The lid 90 is thus released and the opening bias of spring hinge 92 causes that lid to spring open.

As soon as the lid opens, the retarding force of wall 72 is removed from the drogue chute 34, and the plunger 192 of the initiator mechanism is freed. The spring 200 causes the plunger to slide outwardly of the tube 184, thereby ejecting the drogue chute from that tube in FIG. 7. The chute is ejected so that air circulates beneath the canopy thereof to open same, and thus drag the main chute out of the container via the drogue chute shroud lines and collector ring 44. The drag exerted on the container by the drogue chute deployment is sufficient to move that container upwardly, so that the inside of slotted plate 118 engages the surface of the T-lug head 130 and thus gap 349 disappears. The upward movement of the container is sufficient to move holes 284 and 290 out of alignment with the detent pin 270, so that when the chute release handle 314 is released, and the spring 266 again urges that detent toward the container, the container will not be locked into the well 30 by that detent. Thus, the locking mechanism 84 is the only structure fastening the chute system 12 to the plane 10.

The drogue chute deploys the main chute and the plane assumes the attitude shown in FIG. 1, with the chutes attached thereto via shroud lines 48, collector ring 50, riser lines 40, tethering bar 114, keeper 82, T-lug 134, well bottom 66 and well wall 64.

Should the emergency causing condition be corrected sufficiently so that powered flight can be resumed, the chute system can be jettisoned, as indicated in FIG. 9. The system can be jettisoned automatically or mechanically. If the chute is jettisoned mechanically, the handle 344 is moved in the direction of arrow 346, thereby withdrawing cotter 160 from hole 146 in lobe 142, and thus freeing the T-lug 134 from engagement with well 30. The entire assembly, chutes and container, is thus freed from engagement with the airplane 10, and the plane drops away therefrom, as shown in FIG. 9. Thereafter, powered flight is resumed.

The parachute system 12 is therefore removable and portable and is amenable to easy movement from one plane to another. A plane is easily adapted to receive the parachute system 12, and thus use thereof is encouraged. The system 12 can prevent loss of life while minimizing damage to the airplane and remain inexpensive as compared to known systems.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A parachute system for stably lowering an aircraft having a fuselage, comprising:
    a container receiving well defined in the fuselage;
    a container for storing a main parachute, said container being portable and positionable in said receiving well prior to take-off of the aircraft and including an open top and a bottom, a keeper device attached to said bottom and having a plate thereon which is spaced from said bottom and which has an elongated slot defined therein, and a lid for covering said container top, said lid being biased open, said main parachute being connected to said container;
    a drogue parachute storage means attached to said container for storing a drogue parachute in said container;
    drogue parachute deploying means attached to said container lid for deploying said drogue parachute from an open container;
    lid locking means on said receiving well for locking said lid over said container top to close said container, said lid locking means including means for releasably holding said lid closed;
    parachute releasing means attached to said container for releasing said lid so that said lid opens to open said container, so that said drogue parachute is deployed by said drogue parachute deploying means;
    said drogue parachute being connected to said main parachute, so that said deployed drogue parachute deploys said main parachute from said open container; and
    container jettisoning means connecting said container to the fuselage in a releasable manner, so that said container can be released from the fuselage to detach said parachute from the aircraft, said container jettisoning means including a lug having a head engageable with said plate via said slot and a body connected to said head and depending therefrom a distance sufficient to locate a free end of said body outside said container when said head is engaged in said slot and a jettison pin removably positioned in said body outside said container for preventing said body from disengaging from said container, and pin removing means for removing said pin from said lug.

2. The system of claim 1, wherein said drogue parachute storage means comprises a tube having an open end located near one edge of said lid and another end located near the center of said lid.

3. The parachute system of claim 1, further including a handle attached to said lid.

4. The parachute system of claim 1, wherein said container is located above and forward of the center of gravity of the aircraft.

5. The parachute system of claim 4, wherein the aircraft has a cockpit and said container is located just forward of the aircraft cockpit.

6. The parachute system of claim 1, wherein the aircraft has wings and a tail and further including sensing means on the wings and the tail to sense failure thereof, and means connecting said sensing means to said parachute releasing means.

7. A parachute apparatus for stably lowering an aircraft having a fuselage, wings and a tail section, comprising:
    a container receiving well defined in the fuselage;
    a container for storing a main parachute, said container having a top and a bottom and including a keeper device attached to said bottom, said keeper device having a plate thereon which is spaced from said bottom and which has an elongated slot defined therein;
    a lid attached to said top by a spring hinge which biases said lid into an open position with respect to said container, said container being portable and positionable within said receiving well;
    drogue chute storage means for storing a drogue chute therein, said storage means being attached to said lid on the inside of said container;
    drogue chute ejecting means attached to said lid adjacent said drogue chute storage means for ejecting a drogue chute from said drogue chute storage means when said lid is open;
    lid locking means on said container receiving well having a detent engageable with said lid for releasably holding said lid closed against the opening bias of said spring hinge;
    chute releasing means attached to said lid locking means for disengaging said detent from said lid to release said lid, thereby permitting said spring hinge to force said lid into an open position, so that said drogue chute ejecting means ejects said drogue chute from said drogue chute storage means;
    chute connecting means attaching said drogue chute to said main chute, so that said drogue chute will deploy said main chute from said container;
    tethering means attaching said main chute to said container;
    chute jettisoning means connecting said container to the fuselage and including a lug having a head engageable with said plate via said slot and a body connected to said head and depending therefrom a distance sufficient to locate a free end of said body outside said container when said head is engaged in said slot, and a jettison pin removably positioned in said body outside said container for preventing said body from disengaging from said container; and
    pin removing means connected to said pin to remove same from said lug body to disconnect said container from said container receiving well, thereby jettisoning the parachute apparatus from the aircraft.

8. The apparatus of claim 7 wherein said lug is a T-lug.

9. The apparatus of claim 8, further including a flange around said body and located within said container.

10. The apparatus of claim 7, wherein said tethering means comprises a bar attached to said container.

11. The apparatus of claim 7, wherein said drogue chute container comprises a tube having an open end located near one edge of said lid and another end located near the center of said lid, and wherein said drogue chute ejecting means comprises a guide tube having one end adjacent said drogue chute container another end and the other end adjacent said spring hinge, a free sliding piston having a head inside said drogue chute tube and a plunger body inside said guide tube, a compression spring inside said guide tube and having one end seated against said spring hinge and the other end seated against said plunger body to urge said piston outwardly of said drogue chute tube for ejecting said drogue chute therefrom.

12. The parachute apparatus of claim 11, further including a detent pin engageable with said piston head to retain said head in position for preventing ejection of said drogue chute.

13. The parachute apparatus of claim 7, wherein said spring hinge is P-shaped.

14. The parachute apparatus of claim 7, wherein said lid includes a lip depending therefrom at an end opposite said hinge and adjacent said lid locking means, said lid locking means including a housing on said container wall, a spring located in said housing, a lid detent pin extending through said housing and extendable through aligned holes in said container receiving well, said container well and said lid lip, a cable release attached to one end of said detent pin for withdrawing said pin from said lid lip hole to release said lid, cable pulling means attached to said cable release for moving said cable release to withdraw said detent pin from said lid lip.

15. The apparatus of claim 14, wherein said cable release is anchored to the fuselage and said cable pulling means includes a pair of vertically spaced fixed rollers and a third roller vertically interjacent said pair of fixed rollers, with the said cable interposed between said fixed rollers and said third roller, a cable attached to said third roller to move said third roller between said fixed rollers and thereby pinch said cable release between said fixed rollers, a sheave connected to said fuselage adjacent said detent pin over which said cable release passes, so that pinching said cable release between said fixed rollers causes said detent pin to be withdrawn from engagement in said lid lip.

16. The parachute apparatus of claim 7, wherein said chute jettisoning means includes a cable attached at one end to said jettisoning pin and attached at the other end to a handle.

17. The parachute apparatus of claim 16, wherein said lug head is spaced from said keeper housing so that upon deployment of said drogue chute, said container moves upwardly a distance sufficient to misalign said lid lip hole and said lid detent pin, so that the lug is the only connection between said container and the fuselage after deployment of said drogue chute.

* * * * *